United States Patent
Chen et al.

(10) Patent No.: US 7,398,537 B2
(45) Date of Patent: Jul. 8, 2008

(54) KEYSTROKE APPARATUS FOR OPTICAL DISK DRIVE

(75) Inventors: Yun-Lung Chen, Tu-Cheng (TW); Jin-Feng Yao, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 309 days.

(21) Appl. No.: 11/188,359

(22) Filed: Jul. 25, 2005

(65) Prior Publication Data
US 2006/0200837 A1    Sep. 7, 2006

(30) Foreign Application Priority Data
Mar. 4, 2005    (CN)    ............ 2005 2 0055501 U

(51) Int. Cl.
G11B 33/02    (2006.01)

(52) U.S. Cl. ................................. 720/647

(58) Field of Classification Search ............. 720/647; 361/685, 686, 726; 369/75.11
See application file for complete search history.

(56) References Cited

U.S. PATENT DOCUMENTS

| | | | |
|---|---|---|---|
| 6,011,687 A * | 1/2000 | Gluskoter et al. ............ 361/686 |
| 6,781,843 B2 * | 8/2004 | Liu et al. ...................... 361/726 |
| 6,891,722 B2 * | 5/2005 | Chen et al. ................... 361/685 |
| 2004/0095718 A1 * | 5/2004 | Salinas et al. ................ 361/685 |
| 2004/0169997 A1 * | 9/2004 | Voon et al. ................... 361/685 |
| 2005/0030721 A1 * | 2/2005 | Shimada et al. .............. 361/726 |
| 2005/0128919 A1 * | 6/2005 | Huang et al. .............. 369/75.11 |
| 2006/0002074 A1 * | 1/2006 | Shih-Tsung .................. 361/685 |

FOREIGN PATENT DOCUMENTS
CN    2631002 Y    8/2004

* cited by examiner

*Primary Examiner*—Tianjie Chen
(74) *Attorney, Agent, or Firm*—Morris Manning Martin LLP; Tim Tingkang Xia, Esq.

(57) ABSTRACT

A keystroke apparatus for an optical disk drive includes a computer bezel (40), an optical disk drive (10) having a keystroke (12), a pressing member (20) movably attached to the computer bezel (40) and at least one spring (30) causing the pressing member (20) to come back to an original position. The pressing member (20) has a slanted resisting portion (25) for abutting against the keystroke (12). When the pressing member (20) is pressed, the resisting portion (25) drives the keystroke (12) to open or close the optical disk drive (10).

20 Claims, 7 Drawing Sheets

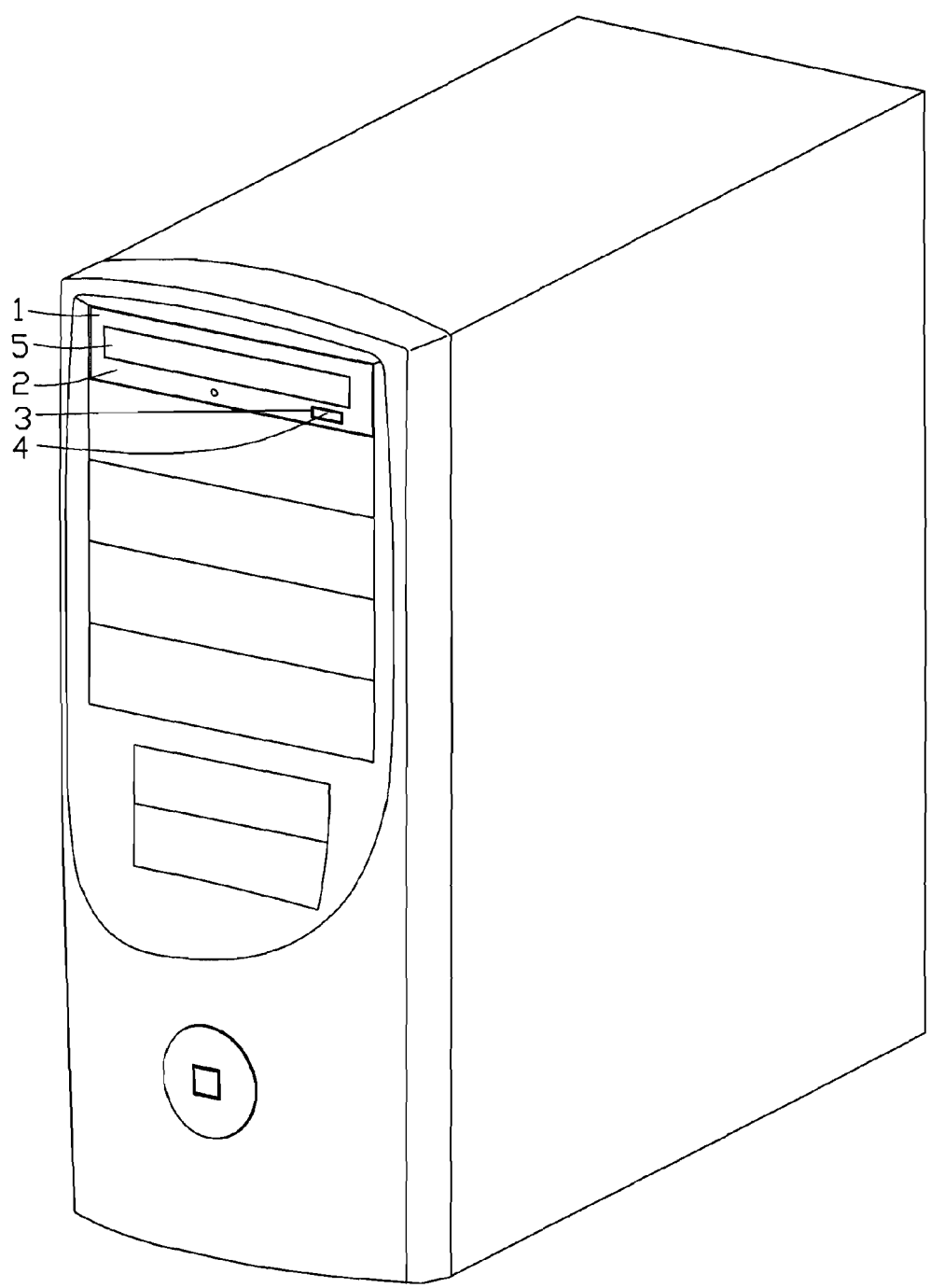
FIG. 7 <PRIOR ART>

KEYSTROKE APPARATUS FOR OPTICAL DISK DRIVE

BACKGROUND OF THE INVENTION

1. Field of the Invention

The present invention relates to a keystroke apparatus for an optical disk drive, and more particularly to a keystroke apparatus for an optical disk drive that operates an optical disk drive conveniently.

2. Background of the Invention

An optical disk drive is an important component in a computer system for copying data, playing movies and dealing with data. Such optical disk drives may be, for instance, CD-ROM/DVD-ROM drives, CD-RW/DVD-RW drives or other similar devices. Service life of an optical disk drive has relations to quality of an optical disk drive, safe use and good maintenance of computer users. As for quality of the optical disk drive, computer users have no measure to control. However, safe use and good maintenance are two effective methods to improve service life of an optical disk drive for computer users.

A conventional keystroke apparatus is directly disposed on an optical disk drive. Referring to FIG. 7, a keystroke 4 of an optical disk drive 1 is exposed outside. A gap may be formed between a mating hole 3 of a front panel 2 of the optical disk drive 1 and the keystroke 4. Thus, dust may enter easily into the optical disk drive 1 to cause reduction of service life of the optical disk drive 1. In addition, before a tray 5 of the optical disk drive 1 enters into the optical disk drive 1, it is inconvenient to press the keystroke 4 below the tray 5. Sometimes, the tray 5 may be damaged accidentally. Understandably, some attempts have been taken to introduce a keystroke apparatus for operating an optical disk drive conveniently.

What is needed, therefore, is a keystroke apparatus for an optical disk drive operating an optical disk drive conveniently.

SUMMARY

A keystroke apparatus for an optical disk drive in accordance with a preferred embodiment of the present invention includes a computer bezel, an optical disk drive having a keystroke, a pressing member movably attached to the computer bezel and at least one spring causing the pressing member to come back to an original position. The pressing member has a resisting portion for abutting against the keystroke. When the pressing member is pressed, the resisting portion drives the keystroke to open or close the optical disk drive.

Other advantages and novel features of the present invention will be drawn from the following detailed description of preferred embodiment of the present invention with the attached drawings, in which:

BRIEF DESCRIPTION OF THE DRAWINGS

FIG. 7 is an assembled isometric view of a conventional keystroke apparatus directly disposed on an optical disk drive.

DETAILED DESCRIPTION OF THE INVENTION

Figure 1:
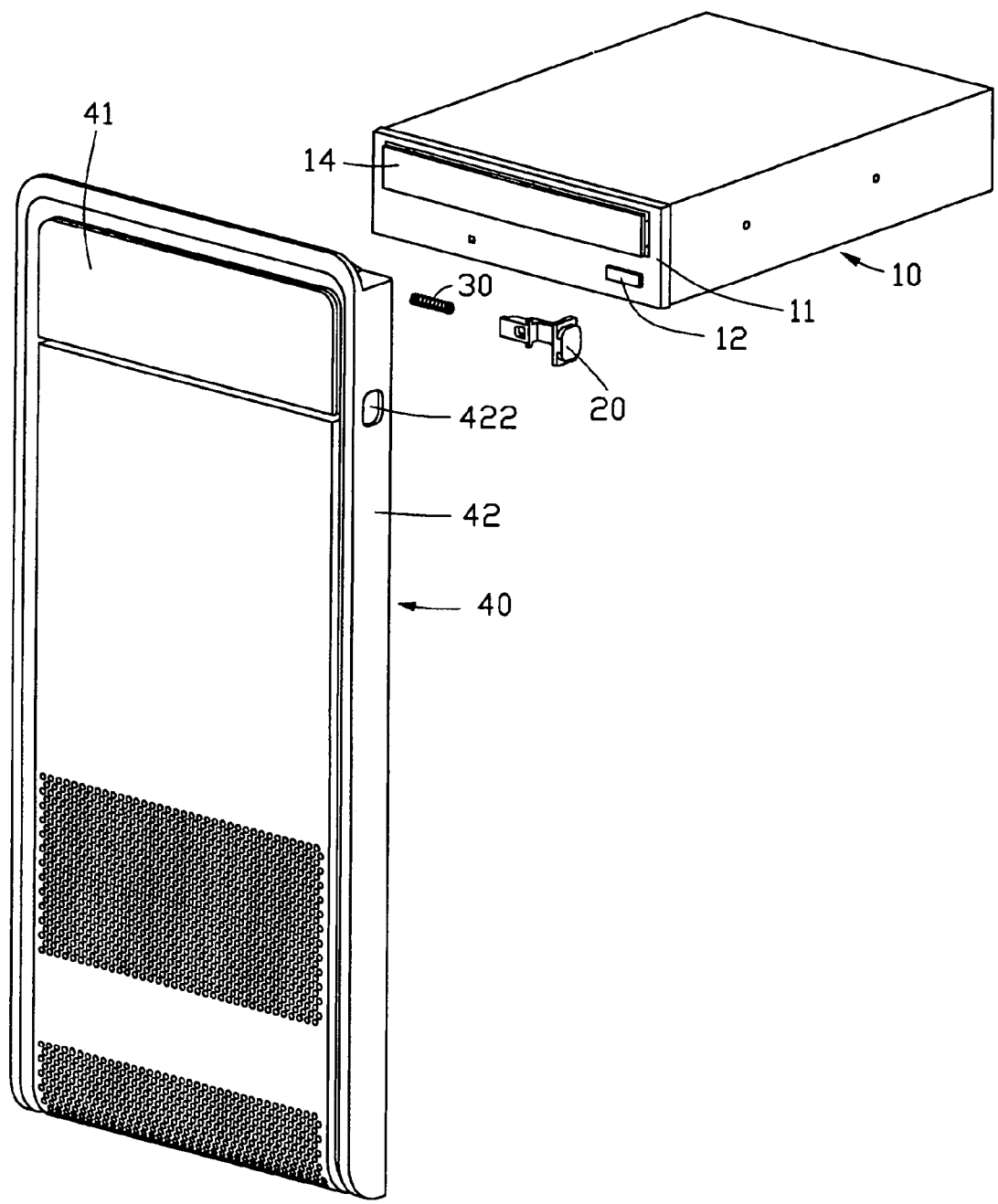
FIG. 1 is an exploded, isometric view of a keystroke apparatus for an optical disk drive in accordance with a first preferred embodiment of the present invention including a computer bezel, a pressing member, a spring and an optical disk drive.

Referring to FIG. 1, a keystroke apparatus for an electronic component of a computing system like an optical disk drive of a computer in accordance with a first preferred embodiment of the present invention includes an optical disk drive 10, a pressing member 20, a spring 30 and a computer bezel 40.

The optical disk drive 10 may be a CD-ROM drive or other devices, such as a DVD-ROM drive, a CD-RW drive, a DVD-RW drive and so on. The optical disk drive 10 includes a front panel 11 and a tray 14. A keystroke 12 is attached to the front panel 11. A cover 41 is pivotably attached to the computer bezel 40 at an upper portion. The computer bezel 40 has a flange 42 with a through hole 422 defined.

Figure 2:
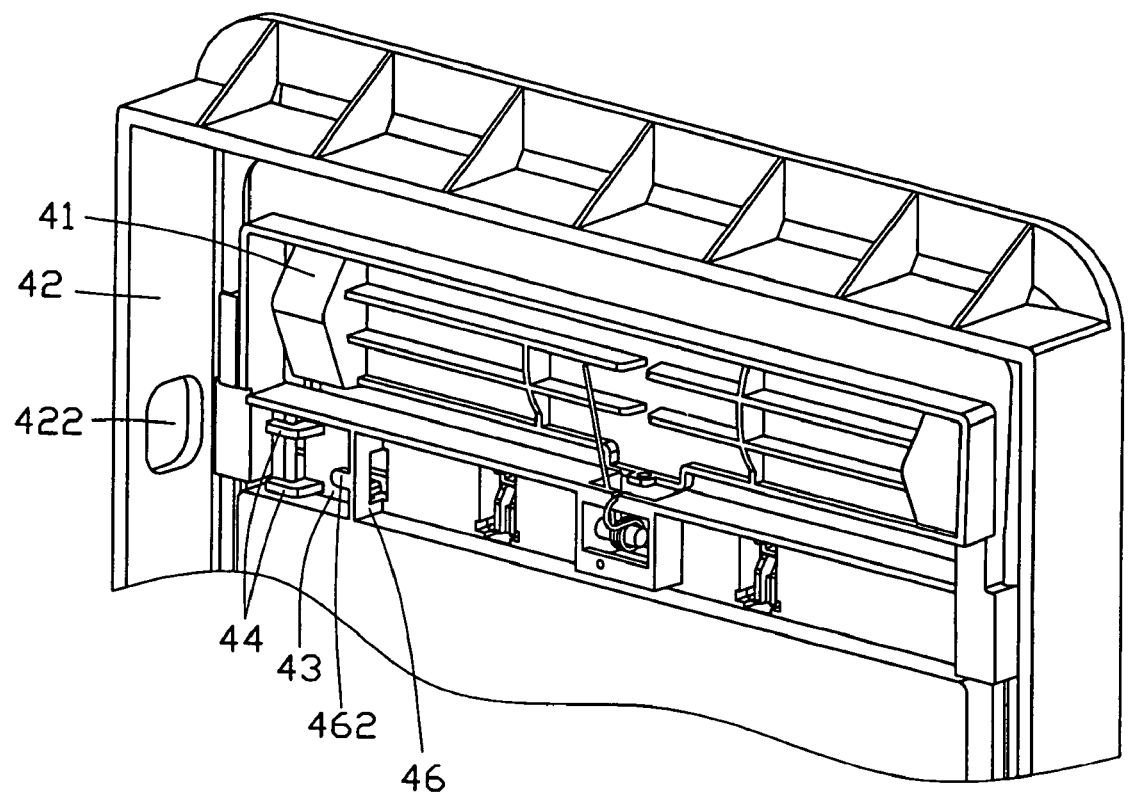
FIG. 2 is an enlarged, isometric view of a part of the computer bezel of FIG. 1.

Referring to FIG. 2, a groove 43 is defined in an inner side of the computer bezel 40. A pair of generally L-shaped positioning blocks 44 extends from the groove 43. A stopping block 46 also extends vertically from an inner side of the computer bezel 40 adjacent to the groove 43. A post 462 extends from the stopping block 46. The cover 41 is pivotably mounted on the computer bezel 40 by a plurality of springs (not labeled).

Figure 3:
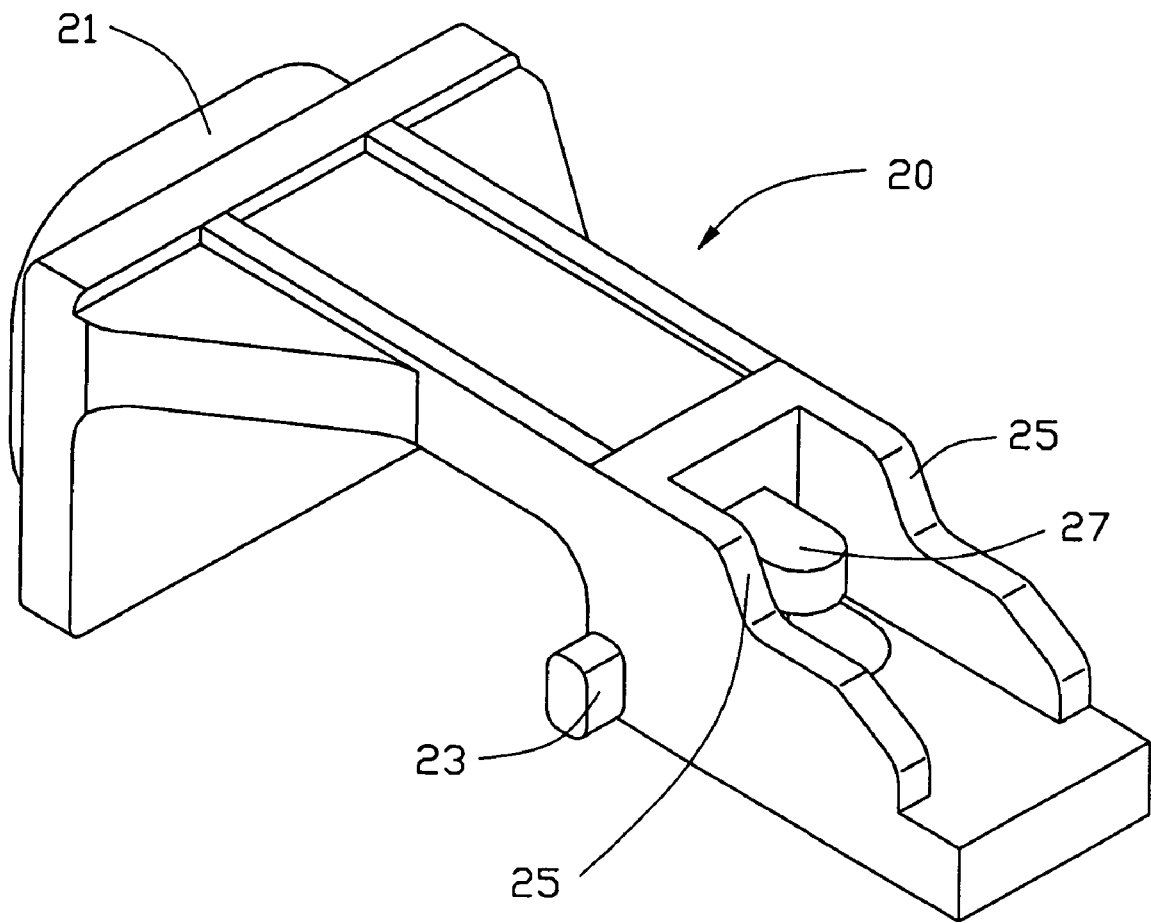
FIG. 3 is an enlarged, isometric view of the pressing member of FIG. 1.

Referring to FIG. 3, the pressing member 20 is slidably mounted to the computer bezel 40. A pressing portion 21 is formed at one end of the pressing member 20. A pair of protrusions 23 extends outwards from a middle portion of the pressing member 20. A pair of opposite resisting portions 25 is formed on the pressing member 20. Each resisting portion 25 has a slanted face for abutting against the keystroke 12. A post 27 is formed on the pressing member 20 between the two resisting portions 25.

Figure 4:
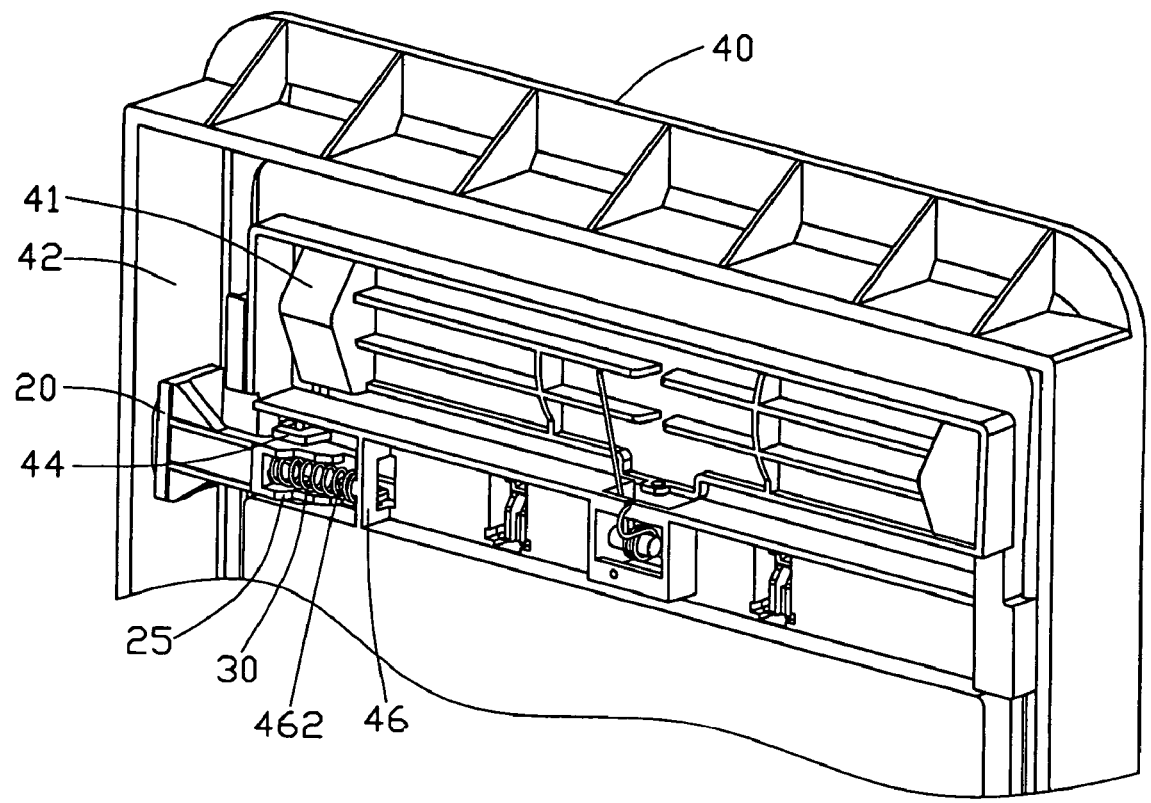
FIG. 4 is an assembled isometric view of FIG. 1, but viewed from another aspect.

Referring also to FIG. 4, in assembly of the pressing member 20, the pressing portion 21 of the pressing member 20 extends transversely through the through hole 422 of the flange 42 of the computer bezel 40. The two protrusions 23 are received into the two generally L-shaped positioning blocks 44 of the computer bezel 40. The spring 30 is disposed around the post 27 of the pressing member 20 and the post 462 of the stopping block 46 of the computer bezel 40. Thus, the pressing member 20 is movably mounted to the computer bezel 40. The spring 30 is compressed.

When the pressing portion 21 of the pressing member 20 is pushed inwards, the resisting portion 25 of the pressing member 20 abuts against the keystroke 12 of the optical disk drive 10. The tray 14 is actuated to extend out from the optical disk drive 10. Then, the tray 14 of the optical disk drive 10 pushes the cover 41 of the computer bezel 40 to pivot outwards. When the pressing portion 21 of the pressing member 20 is pushed inwards again, the resisting portion 25 of the pressing member 20 abuts against the keystroke 12 of the optical disk drive 10 again. The tray 14 of the optical disk drive 10 enters into the optical disk drive 10. Then, the cover 41 of the computer bezel 40 comes back to an original position due to a plurality of springs for preventing from entrance of dust.

Figure 5:
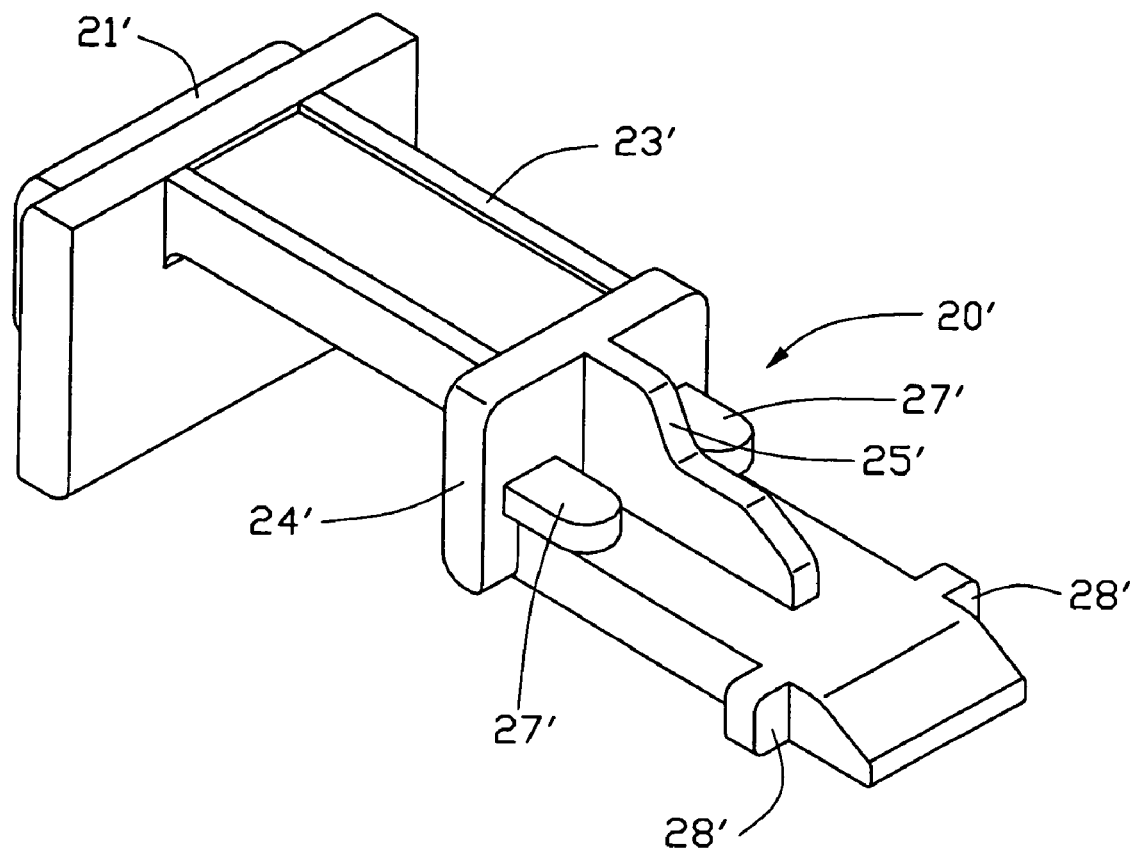
FIG. 5 is an enlarged, isometric view of a pressing member of a keystroke apparatus for an optical disk drive in accordance with a second preferred embodiment of the present invention.
Figure 6:
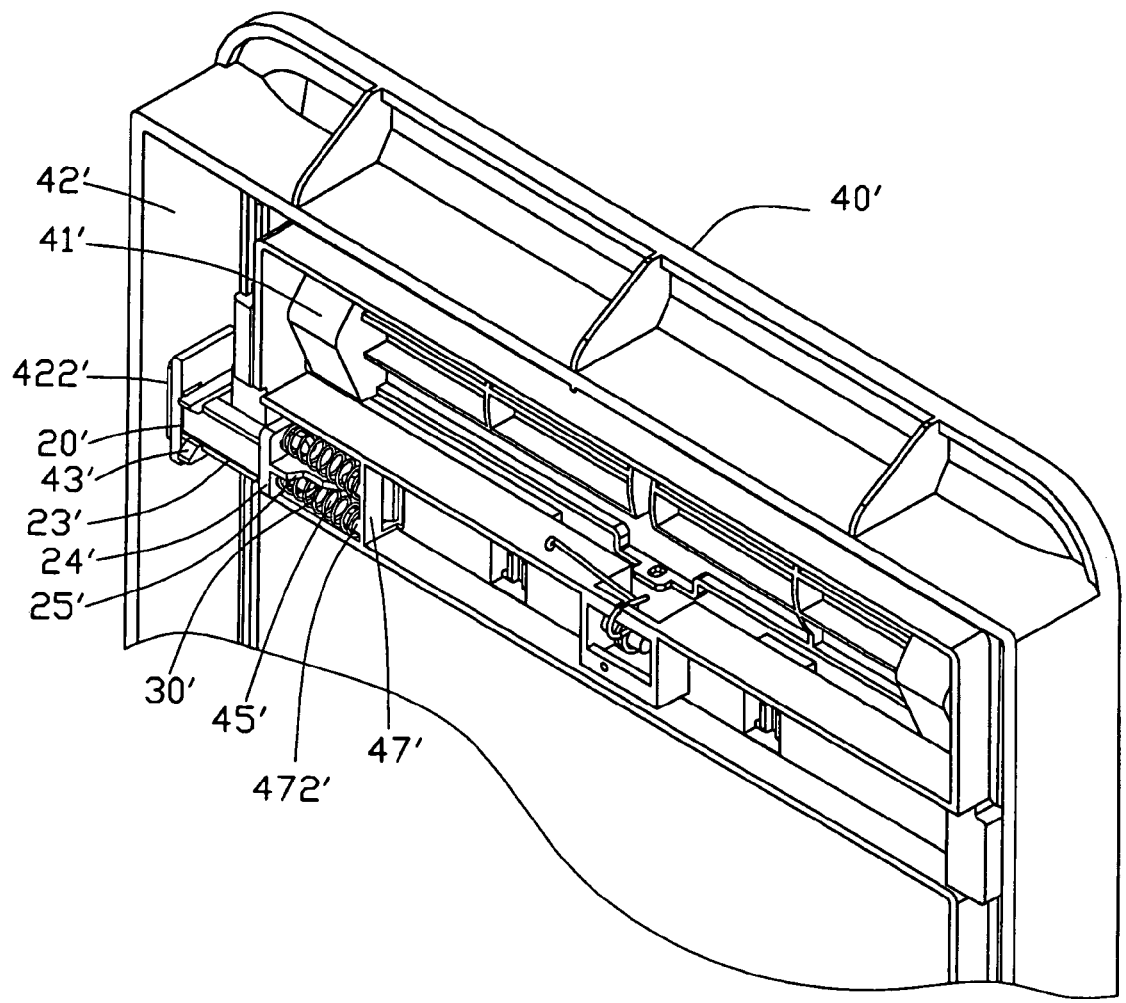
FIG. 6 is assembled isometric views of a keystroke apparatus for an optical disk drive in accordance with a second preferred embodiment of the present invention, but viewed from another aspect.

Referring to FIGS. 5 and 6, a keystroke apparatus for an optical disk drive in accordance with a second preferred embodiment of the present invention includes the optical disk drive 10, a pressing member 20', two springs 30', a computer bezel 40'. In the second preferred embodiment of the present invention, above-mentioned members such as the optical disk drive is the same to the first preferred embodiment of the present invention, therefore, the label of members is not changed and follows the label of members of the first preferred embodiment of the present invention.

The pressing member 20' is slidably mounted to the computer bezel 40'. A pressing portion 21' is formed at a front end of the pressing member 20'. A sliding portion 23' is formed in a middle portion of the pressing member 20'. A stopping block 24' is formed at one end of the sliding portion 23'. A resisting portion 25' with a slanted face extends vertically from the stopping block 24'. A pair of posts 27' extends vertically from the stopping block 24' at right side and left side of the resisting portion 25'. A pair of protrusions 28' extends outwards from a rear portion of the pressing member 20'.

A cover 41' is pivotably mounted on the computer bezel 40' by a plurality of springs (not labeled). The computer bezel 40' has a flange 42' with a through hole 422' defined. A pair of hooks 43' is formed on the computer bezel 40'. A groove 45' is defined in an inner side of the computer bezel 40'. A stopping block 47' also extends vertically from the inner side of the computer bezel 40' adjacent to the groove 45'. A pair of posts 472' extends from the stopping block 47'.

In assembly of the pressing member 20', the pressing portion 21' of the pressing member 20' extends transversely through the through hole 422' of the flange 42' of the computer bezel 40'. The sliding portion 23' of the pressing member 20' is received into the two hooks 43' of the computer bezel 40'. The rear portion of the pressing member 20' is received into the groove 45' of the computer bezel 40'. Two springs 30' are disposed around the post 27' of the pressing member 20' and the post 472' of the stopping block 47' of the computer bezel 40'. Thus, the pressing member 20' is movably mounted to the computer bezel 40'. The two spring 30' are compressed.

When the pressing portion 21' of the pressing member 20' is pushed inwards, the two protrusions 28' are stopped by the two posts 472' of the stopping block 47' to prevent the pressing member 20' from tilting. Simultaneously, the resisting portion 25' of the pressing member 20' abuts against the keystroke 12 of the optical disk drive 10. The tray 14 is actuated to extend out from the optical disk drive 10. Then, the tray 14 of the optical disk drive 10 pushes the cover 41' of the computer bezel 40' to pivot outwards. When the pressing portion 21' of the pressing member 20' is pushed inwards again, the resisting portion 25' of the pressing member 20' abuts against the keystroke 12 of the optical disk drive 10 again. The tray 14 of the optical disk drive 10 enters into the optical disk drive 10. Then, the cover 41' of the computer bezel 40' comes back to an original position due to a plurality of springs for preventing from allowing access to dust.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:

1. A keystroke assembly for an electronic component, comprising:
   a bezel of a computing system having a flange;
   an electronic component of the computing system having a front panel perpendicular to the flange, a keystroke being attached to the front panel; and
   a pressing member slidably mounted on the flange of the bezel and locating between the bezel and the electronic component, the pressing member having a resisting portion for abutting against the keystroke to urge the electronic component to open or close.

2. The keystroke assembly as recited in claim 1, wherein the keystroke assembly further comprises at least one spring causing the pressing member to come back to an original position thereof.

3. The keystroke assembly as recited in claim 2, wherein a pair of posts is formed on the pressing member and a pair of posts is formed on the bezel, and two springs of the at least one spring are disposed respectively around the two posts of the pressing member and the two posts of the bezel.

4. The keystroke assembly as recited in claim 3, wherein the pressing member has a sliding portion, and the bezel has a pair of hooks for receiving the sliding portion.

5. The keystroke assembly as recited in claim 4, wherein the bezel forms a stopping block for restricting the pressing member to move.

6. The keystroke assembly as recited in claim 2, wherein a post is formed on the pressing member and a post is formed on the bezel, and the spring is disposed around the two posts.

7. The keystroke assembly as recited in claim 1, wherein a pair of opposite protrusions is formed on the pressing member, and a pair of positioning blocks is formed on the bezel for receiving the protrusions therein and restricting movement of the protrusions.

8. The keystroke assembly as recited in claim 1, wherein the resisting portion has a slanted face for abutting against the keystroke.

9. The keystroke assembly as recited in claim 1, wherein a through hole is defined in the flange of the bezel, and the pressing member forms a pressing portion for extending through the through hole.

10. A computing system comprising:
    a bezel partially enclosing said computing system along a first surface thereof, and defining an access on said first surface to enter said computing system;
    an electronic component performing a predetermined function for said computing system and disposed beside said first surface in said computing system, said electronic component being exposable out of said computing system and extendable across said first surface through said access of said bezel, and comprising a keystroke formed thereon to face said first surface and be capable of triggering exposedness and extension of said electronic component by means of being operated along a direction across said first surface; and
    a pressing member movably disposed in said bezel next to said keystroke and operable along another direction across a second surface other than said direction across said first surface, said pressing member being operable to move toward said keystroke along said another direction for being capable of pressing said keystroke along said direction.

11. The computing system as recited in claim 10, wherein said first and second surfaces are substantially orthogonal to each other.

12. The computing system as recited in claim 10, wherein a post is formed on said pressing member and a post is formed on said bezel, and a spring is disposed around said two posts.

13. The computing system as recited in claim 10, wherein a pair of opposite protrusions is formed on said pressing member, and a pair of positioning blocks is formed on said bezel for receiving said pair of protrusions therein and restricting movement of said pair of protrusions.

14. The computing system as recited in claim 10, wherein a resisting portion is formed on said pressing member and has a slanted face for abutting against said keystroke.

15. The computing system as recited in claim 10, wherein a pair of posts is formed on said pressing member and a pair of posts is formed on said bezel, and the two springs are disposed respectively around said pair of posts of said pressing member and said pair of posts of said bezel.

16. The computing system as recited in claim 10, wherein said pressing member has a sliding portion, and said bezel has a pair of hooks for receiving said sliding portion.

17. The computing system as recited in claim 10, wherein a through hole is defined on said second surface, and said pressing member forms a pressing portion for extending through said through hole.

18. A computing system comprising:
 a bezel partially enclosing said computing system, and defining an access to enter said computing system;
 an electronic component performing a predetermined function for said computing system and disposed next to said bezel in said computing system, said electronic component being exposable and extendable to an outside of said computing system through said access of said bezel along a first direction, and comprising a keystroke formed thereon capable of triggering exposedness and extension of said electronic component by means of being pressed along said first direction; and
 a pressing member disposed in said bezel next to said keystroke and exposable to said outside of said computing system to be operable, said pressing member being operable to move toward said keystroke along a second direction different from said first direction for being capable of pressing said keystroke along said first direction.

19. The computing system as recited in claim 18, wherein said first and second directions are perpendicular to each other.

20. The computing system as recited in claim 18, wherein said pressing member is capable of pressing said keystroke by means of a slanted resisting portion formed at one end thereof.

* * * * *